United States Patent [19]
Skarbo

[11] 3,907,966
[45] Sept. 23, 1975

[54] NICKEL EXTRACTION AND STRIPPING USING OXIMES AND AMMONIACAL CARBONATE SOLUTIONS

[75] Inventor: Roald R. Skarbo, Lexington, Mass.

[73] Assignee: Kennecott Copper Corporation, New York, N.Y.

[22] Filed: July 19, 1973

[21] Appl. No.: 380,792

Related U.S. Application Data

[63] Continuation-in-part of Ser. No. 266,981, June 28, 1972, Pat. No. 3,855,090, and a continuation-in-part of Ser. No. 266,985, June 28, 1972, Pat. No. 3,853,725.

[52] U.S. Cl............................ 423/139; 75/101 BE
[51] Int. Cl............................................. C01G 53/12
[58] Field of Search ........ 423/139; 75/101 BE, 119, 75/117, 103

[56] References Cited
UNITED STATES PATENTS

| | | |
|---|---|---|
| 2,711,958 | 6/1955 | Schautelberger et al............ 75/103 |
| 2,805,918 | 9/1957 | Van Hare et al..................... 75/103 |
| 3,276,863 | 10/1966 | Drobnick et al...................... 75/117 |
| 3,428,449 | 2/1969 | Swanson............................... 75/117 |
| 3,761,249 | 9/1973 | Ritcey et al..................... 75/101 BE |

Primary Examiner—Oscar R. Vertiz
Assistant Examiner—Brian E. Hearn
Attorney, Agent, or Firm—Jerry Cohen; Lowell H. McCarter; John L. Sniado

[57] ABSTRACT

Ammoniacal solutions containing nickel and other metal values are adjusted to low $NH_3$ concentration and treated by liquid-liquid ion exchange extraction with an oxime organic extractant and then the loaded organic extractant is stripped with a highly concentrated ammonium salt solution to yield a strip concentrate from which nickel or nickel oxide is recoverable without electrolytic treatment.

4 Claims, 2 Drawing Figures

NICKEL EXTRACTION AND STRIPPING USING OXIMES AND AMMONIACAL CARBONATE SOLUTIONS

CROSS REFERENCE TO RELATED APPLICATIONS

This application is a continuation-in-part of said application Ser. Nos. 266,981 now U.S. Pat. No. 3,855,090 and 266,985 now U.S. Pat. No. 3,853,725.

This application relates to hydrometallurgy and more particularly to liquid-liquid extraction wherein aqueous solutions of mixed metal values are contacted with organic extractants to transfer one or more of the metal values to the extractant and the loaded organic is stripped into a solution from which the metal value(s) is recoverable. Related U.S. Pat. applications, all of common assignment with this application, are Ser. No. 266,985 filed June 28, 1972; Ser. No. 266,981, filed June 28, 1972; Ser. No. 266,986 filed June 28, 1972; and Ser. No. 317,003 filed Dec. 20, 1972 and Ser. No. 380,790 L-305, 380,793 L-260 filed June 28, 1972 on even date herewith.

BACKGROUND OF THE INVENTION

Liquid-liquid extraction has been pursued as a simple and economical method for treatment of reduced metal ores and other concentrates generally and in selected applications where such extraction can be uniquely effective. Several solvent extraction processes used in connection with extraction of copper values are described in U.S. Pat. Nos. 3,197,274; 3,224,873; 3,284,501; 3,428,449; 3,592,775; 3,655,347; the above cited applications, and in Ritcey and Lucas, "Separation of Copper from Nickel and Cobalt by Liquid-Liquid Extraction from Ammonical solutions", Canadian Mining and Metallurgical Bulletin, May 1972, pp. 46–50, and "Novel Solvent Extraction Process", Chemistry In Canada, December 1972 pp. 39–40 and also in Agers, "Copper Recovery From Acid Solutions Using Liquid Ion Exchange", 235 Trans. Soc'y Mining Engrs 191–8 (1966) and Hartlage, "Kelex 100 - A New Reagent for Copper Extraction", paper at Sept. 69 Salt Lake City Meeting of Society of Mining Engrs. Nickel extraction is described in British Pat. No. 1,168,858 and iron, nickel, and cobalt extraction are described in U.S. Pat. Nos. 3,399,055 and 3,701,650.

Commercial scale applications are described in McGarr, "Cost of Copper Solvent Extraction and Electrowinning Look Great on Paper" 170 Eng. Mining J. 66 (1969) and "Solvent Extraction Stars in Making Ultrapure Copper" 77 Chem. Eng. 82 (1970); and Rawling, "Commercial Solvent Extraction Plant Recovers Copper from Leach Liquors", 15 World Mining 310–33 (1969).

In these processes a barren organic phase contacts a metal value loaded aqueous phase in countercurrent or cross-current fashion over several stages. Hydrogen ion from the organic phase exchanges with metal ion from the aqueous phase and the organic phase emerges loaded with metal values and the aqueous phase emerges depleted in part of said values. The two phases are mutually immiscible and pH of the aqueous phase is controlled to adjust the metal selectivity of the exchange process and yields thereof.

The organic liquid ion exchange agents of choice are oximes [compounds which contain the radical —CH(:-N.OH), being condensation products of aldehydes or ketones with hydroxylamine] usually in a carrier such as kerosene. Oxines are also usable. The aqueous liquid, often dictated as much by prior steps of metal value extraction from ores than by the ion exchange process, often comprise ammoniacal solutions, e.g., (a) being the leach liquors from laterite ore [or other nickel oxidic ore] leaching as described in Merrigold et al. "Recovery of Nickel by Liquid Ion Exchange Technology", chapter 21 of International Symposium on Hydrometallurgy Proceedings, pp. 552–587 of British Pat. No. 1,168,858; (b) leach liquors obtained by ammonium salt solution leaching of manganese deep sea modules to pick up copper and nickel values therefrom as noted in said application Ser. No. 266,986 and U.S. Pat. No. 3,728,105; (c) ammonium sulfate/ammonia solvents for nickel sulfide concentrates as described in Ritcey et al, supra; (d) leaches of native copper or oxidic copper ores as described by Kunda et al in "Production of Copper by Non-Smelting Techniques", Feb. 1970 AIME Denver meeting.

After the extraction(s), the metal loaded organic phase may be stripped by acid cross current or countercurrent contact as described in the above cited applications, thereby transferring metal values to a acid solution. The metal loaded acid solution is electrolytically treated to electrowin metal therefrom.

It is a principal object of the invention to provide an extraction and strip process of recovery of metal values from ammoniacal leach liquors which avoids the electrowinning step(s) particularly in connection with nickel recovery.

It is a further object of the invention to provide a simple and economical process consistent with the preceding object.

It is a further object of the invention to accommodate multiple metal values in the organic phase consistent with one or both of the preceding objects.

It is a further object of the invention to provide reusable stripped organic and aqueous phases consistent with one or more of the preceding objects.

It is a further object of the invention to provide low numbers of extraction and stripping stages and low contact times per stage consistent with one or more of the preceding objects.

It is a further object of the invention to limit the generation of byproducts consistent with one or more of the preceding objects.

SUMMARY OF THE INVENTION

According to the invention, an ammoniacal solution of mixed metal values is adjusted to low ammonia concentration and low alkalinity and extracted by contact with an organic phase to load metal values into the organic phase by metal ion-hydrogen ion exchange therewith and the loaded organic is stripped by contact with a highly ammoniacal solution, preferably including ammonium carbonate. The stripped metal comprises a carbonate thereof which can be converted to usable oxide or reduced to usable elemental powder.

The process is distinctly effective as applied to extraction and stripping of nickel from nickel-cobalt loaded ammoniacal aqueous solution after prior treatment thereof to extract and strip copper as taught in the above cited applications. Nickel carbonate or other nickel compounds produced in the process can be pressure reduced to produce nickel powder or calcined to produce a nickel oxide usable in steel making or other high temperature alloys. The oxide can also be reduced to make a nickel powder usable in steel making, ferrites, enamel frits, or as a powder metallurgy material in electronic components, magnets, cermets, or in catalysts and alkaline battery electrode manufacture.

Other anions, e.g., Cl⁻, may be substituted for carbonate ion in the above described processes. The above processes can also be adapted to continuous coextraction of multiple metal values as well as sequential selective extraction of individaul metal values.

These and other objects, features and advantages of the invention will be apparent from the following detailed description with reference therein to the accompanying drawing in which

BRIEF DESCRIPTION OF THE INVENTION

FIG. 1 is an equilibrium curve illustrating stability/instability conditions used in a preferred embodiment of practice of the invention; and FIG. 2 is a schematic diagram of a preferred embodiment of an extraction-stripping process in accordance with the invention.

DETAILED DESCRIPTION OF THE PREFERRED EMBODIMENTS OF THE INVENTION

Figure 1:
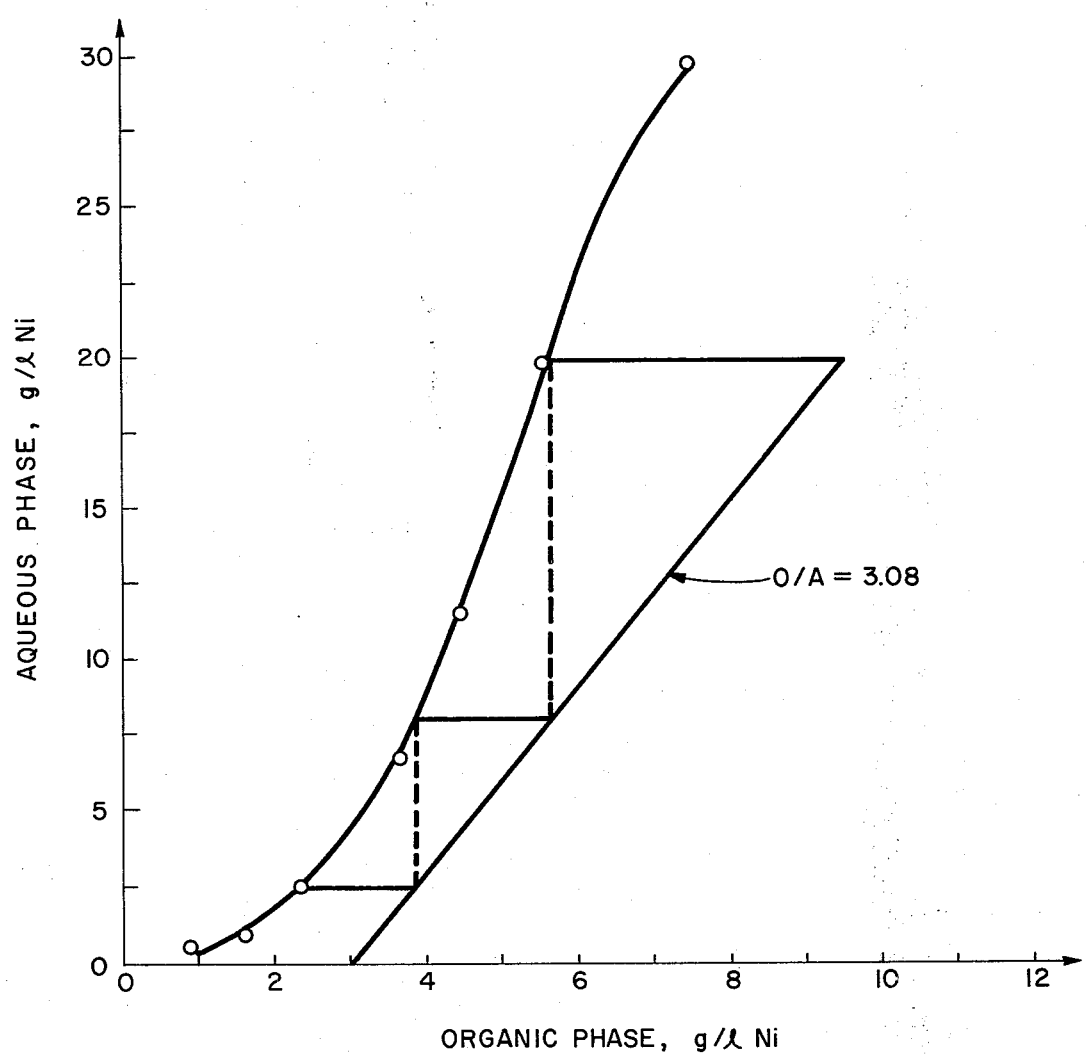

The aqueous feed for nickel extraction is a basic aqueous solution containing 20–60, preferably 30 grams $NH_3$ per liter. The strip solution would be a basic aqueous solution having 80–200, preferably 150 grams $NH_3$ per liter and 50–100 g/l. $CO_2$.

The process becomes more efficient as the $NH_3$ (total) concentration of the leach solution is decreased. The lower limit will in practice depend on mutual loading of leach solutions; that is, one can remove $NH_3$ from solution to a value just above the metal solubility limit. Stripping becomes more efficient as the $NH_3$ concentration is increased. However, at overly high concentrations, poor phase separation and emulsion problems may occur.

OXIME CHELATING AGENTS

The oximes in solution containing nickel and copper which can be processed in accordance with this invention include α-hydroxy oximes, substituted hydroxy benzophenoximes, and mixtures thereof.

The α-hydroxy oxime component has the general formula

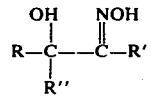

where R, R' and R'' may be any of a variety of organic hydrocarbon radicals such as aliphatic and alkylaryl radicals. R'' may also be hydrogen. Preferably, R and R' are unsaturated hydrocarbon or branched chain alkyl groups, containing from about 6 to 20 carbon atoms, R and R' are also preferably the same and, when alkyl, are preferably attached to the carbons substituted with the —OH and =NOH groups through a secondary carbon atom. It is also preferred that R'' is hydrogen or unsaturated hydrocarbon or branched chain alkyl groups containing from about 6 to 20 carbon atoms. The Δ-hydroxy oximes also preferably contain a total of about 14 to 40 carbon atoms. Representative compounds are 19-hydroxyhexatriaconta-9, 27-dien-18-oxime, 5-10-diethyl-8-hydroxy-tetradecan-7-oxime, and 5,8-diethyl-7-hydroxy-dodecane-6-oxime. The latter compound has the following structural formula:

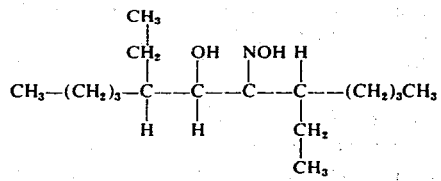

Representative of other mono- and polyunsaturated radicals are heptenyl, octenyl, decenyl, octadecenyl, octadecenyl and alkyl substituted radicals such as ethyloctadecenyl. Representative of other mono-and polyalkyl substituted saturated radicals are ethylhexyl, diethyleheptyl, butyldecyl, butylhexadecyl, ethylbutyldodecyl, butylcyclohexyl and the like.

The α-hydroxy oxime component is also characterized as having a solubility of at least 2% by weight in the hydrocarbon solvent used to make up the organic phase and substantially complete insolubility in water.

The substituted benzophenoximes useful in the present invention have the formula:

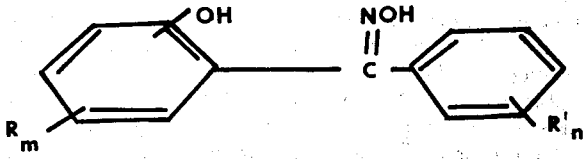

in which R and R' may be individually alike or different and are saturated aliphatic groups, ethylenically unsaturated aliphatic groups or saturated or ethylenically unsaturated aliphatic ether groups (i.e. — OH'') and m and n are 0, 1, 2, 3 or 4 with the proviso that m and n are not both 0. The total number of carbon atoms in $R_m$ and $R'_n$ is from 3–25. R and R' contain 1 to 25 carbon atoms when saturated aliphatic and 3 and 25 carbon atons when they are ethylenically unsaturated groups. Preferably, the position ortho to the phenolic OH substituted carbon atom is unsubstituted and also preferably the positions ortho to the oxime carbon atom on the other aromatic nucleus are unsubstituted. Branched chain saturated aliphatic hydrocarbon substituents are preferred. Compounds of the above type include the following.

2-hydroxy-3' methyl-5-ethylbenzophenoxime
2-hydroxy-5-(1,1-dimethylpropyl)-benzophenoxime
2-hydroxy-5-(1,1-dimethylethyl)-benzophenoxime
2-hydroxy-5-octylbenzophenoxime
2-hydroxy-5-nonyl-benzophenoxime
2-hydroxy-5-dodecyl-benzophenoxime
2-hydroxy-2',4'-dimethyl-5-octylbenzophenoxime
2-hydroxy-2', 3', 5'-trimethyl-5-octylbenzophenoxime
2-hydroxy-3, 5-dinonylbenxophenoxime
2-hydroxy-4'-(1,1-dimethylethyl)-5-(2-pentyl)-benzo-phenoxime
2-hydroxy-4'-(1,1-dimethylethyl)-5-(2-butyl)-benzophenoxime
2-hydroxy-4-dodecyloxybenzphenoxime 2-hydroxy-4'-(1-dimethylethyl)-5-methyl-benxophenoxime
2-hydroxy-4',5-bis'(1,1-dimethylethyl) benxophenoxime When the α-hydroxy aliphatic oximes are employed in combination with the 2-hydroxy benxophenoximes, the α-hydroxy aliphatic oxime extractants having the following general formula may be used:

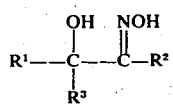

where $R^1$, $R^2$ and $R^3$ may be any of a variety of organic radicals such as aliphatic and alkylaryl radicals. $R^3$ may also be hydrogen. Preferably, $R^1$ and $R^2$ are unsaturated hydrocarbon or branched chain alkyl groups containing from 6 to 20 carbon atoms. $R^1$ and $R^2$ are also preferably the same and when alkyl are preferably attached to the carbons substituted with the —OH and =NOH groups through a secondary carbon atom. It is also preferred that $R^3$ is hydrogen on unsaturated hydrocarbon or branched chain alkyl groups containing from 6 to 20 carbon atoms. The α-hydroxy oximes also preferably contain a total of 14 to 40 carbon atoms. Representative compounds are 19-hydroxyhexatriaconta-9,27-dien-18-oxime, 5,10-diethyl-8-hydroxytetradecan-7-oxime, and 5,8-diethyl-7-hydroxydodecane-6-oxime. The latter compound has the following structural formula:

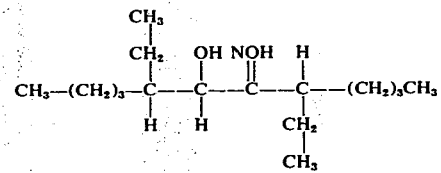

Representative of other mono-and polyunsaturated radicals are heptenyl, octenyl, decenyl, octadecenyl, octadecynyl and alkyl substituted radicals such as ethyloctadecenyl. Representative of other mono-and polyalkyl substituted saturated radicals are ethylhexyl, diethylheptyl, butyldecyl, butyl-hexadecyl, ethylbutyl-dodecyl, butylcyclohexyl and the like. The $R^1$, $R^2$ and $R^3$ groups may contain inert substituents.

The relative amounts of the two extractants in the compositions of the present invention can be varied widely with even minute quantities of the α-hydroxy aliphatic oxime being beneficial. However, it is preferred to employ it in the range of 1 to 100% by weight based on the weight of the 2-hydroxy benzophenoxime. The amount of the extractants in the organic solvent likewise can vary within considerable limits. In general, however, the concentration of total oxime is in the range 2–40% based on the weight of the organic extracting solution.

These and other suitable oximes are disclosed for example by the above cited U.S. patents. The nickel and copper are introduced into the oxime to form a chelate therewith by contacting the oxime with an aqueous leach solution containing copper and nickel. Particularly suitable extractants are 2-hydroxy-4-nonylbenxophenoxime which is a primary extractant in a composition also containing an α-hydroxy oxime sold by General Mills Inc. under the tradename LIX-64N, 5.8-diethyl-7-hydroxy-6-dodecanone oxime which is the primary extractant in a composition sold by General Mills Inc., under the tradename, LIX-63 and 2-hydroxy-4-dodecyl-benxophenoxime which is the primary extractant in a composition also containing an α-hydroxy oxime sold by General Mills, Inc. under the tradename LIX-64. LIX-65N: essentially 64N without any LIX-63, α-hydroxyoxime, in it. Kelex 100 and Kelex 120 oxine extractants are also useful.

Referring now to FIG. 1, there is shown a strip equilibrium for nickel loaded 40 volume % LIX-64N solution [in kerosene] illustrating as a preferred set of operating conditions in practice of the process of the invention. The conditions for establishment of the O/A=3.08 operating line therein would be 9.5 g/1 Ni in the loaded organic and 3.0 g/1 Ni in the stripped organic with 20.0 g/1 Ni in the aqueous strip concentrate.

Figure 2:
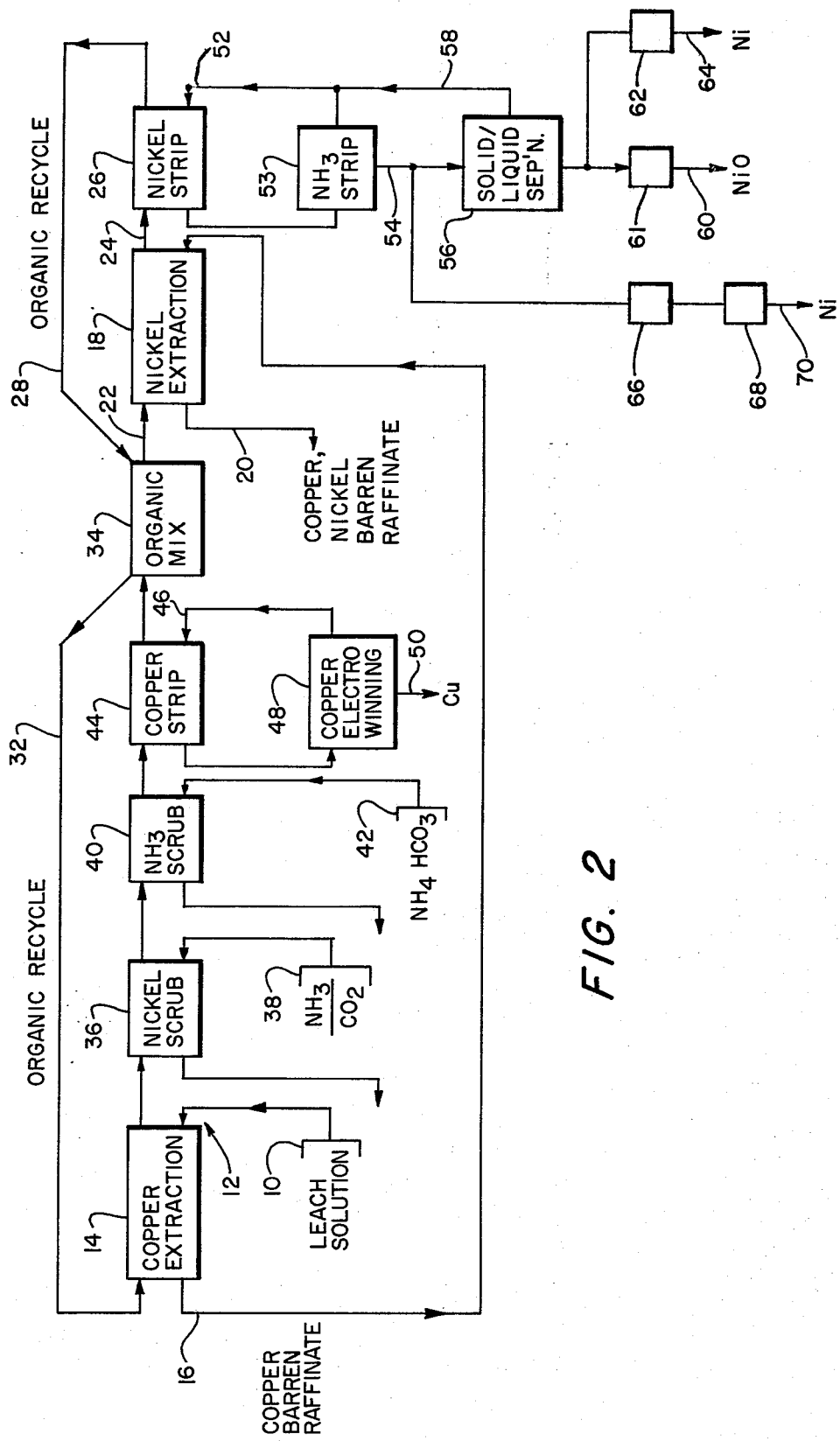

Referring to FIG. 2, there is shown an extraction/stripping process for sequential copper and nickel recovery using the above described operating conditions.

An aqueous leach solution at 10 containing copper, nickel and cobalt values is fed to the inlet 12 of a multistage array of extraction equipment 14 and emerges at 16 as a copper barren solution. The solution is fed to a multistage array of extraction equipment 18 and emerges at 20 as copper, nickel barren solution which may be discarded or further processed to recover other metal values [e.g., cobalt, molybdenum] or recycled for reuse.

The equipment 14 and 18 comprises mixer-settler extraction apparatus, preferably of the type described in chapter 10 of Treybal, "Liquid Extraction" (McGraw-Hill 1963) and provides stagewise mixing contact between an immiscible organic solvent phase and the aqueous leach liquor phase, with intermediate settling separation of the two phases so that the organic phase emerges loaded with metal values transferred thereto by the aqueous phase. The organic phase emerging from extraction equipment 18 at 24 is next fed to a multi-stage array of stripping equipment 26. The stripping equipment is essentially the same as the extraction equipment excepting that flow rates therein and solute concentrations of organic and aqueous phases therein and selection of aqueous phase therein are adjusted so that a nickel barren organic solvent emerges therefrom and this is circulated back in a recycle loop 28.

The organic recycle loop for the nickel extraction and stripping is tied into a similar organic recycle loop 32 for copper extraction and stripping via a mixing tank 34.

Organic solvent loaded with copper values from the above described copper extraction equipment 14 passes through a multi-stage array or single stage of nickel scrubbing equipment 36 fed with ammonia and carbon dioxide from a source 38, a multistage array or single stage of ammonia scrub equipment 40 fed with ammonium bicarbonate from a source 42, a multi-stage array of copper stripping equipment 44 and then to mixer 32.

Sulfuric acid is circulated as an aqueous phase through a loop 46 contacting the organic phase in equipment 44 and passing through electrolytic equipment 48 for recovery of electrowon copper at 50 in the form of cathodes, usable per se or convertable to other useful forms through mechanical working and/or through melting or heat treatments.

Equipment 36, 40, 44, 48 may be as described in the above cited application Ser. No. 266,986. Typically four stages of copper extraction and of copper stripping, two stages of nickel extraction and three stages of nickel strip and one or two of each scrub would be used or modified depending on solutions to be treated and economic optomization consideration.

A recirculating aqueous phase in loop 52. 58 contacts the nickel loaded organic phase in strip equipment 26 and is stripped of ammonia and carbon dioxide in stripping equipment 53, thereby precipitating basic nickel carbonate. The nickel precipitate and ammonia stripped aqueous phase are fed to a solids/liquids separator 56 to recover aqueous phase for recirculation via 58 and producing nickel oxide at 60 usable directly or processable in high temperature reduction equipment to produce nickel powder at 64. Alternatively, the nickel carbonate slurried in aqueous carrier product of ammonia stripper 53 can be pressure reduced in apparatus 66 and passed through a solids/liquids separator 68 to produce nickel powder at 70.

The practice of the invention is further illustrated by the following non-limiting examples.

EXAMPLE 1

Nickel loaded 40 volume % LIX-64N was prepared by contacting fresh organic twice with a solution containing 8 g Ni, 30 g $NH_3$ and 25 g $CO_2$/l. An O/⅓ ratio of 1.0 was used. The loaded organic analyzed 10.5 g Ni/l. A 100 ml portion of the organic was then stripped with 50 ml of aqueous solution analyzing 150 g $NH_3$ and 88 g $CO_2$/l. The contact time was 6 minutes. The obtained strip concentrate contained 11.5 g Ni/l. Nickel can be recovered from the latter solution by conventional methods. The stripped organic contained 4.46 g Ni/l. After stripping, the organic can be recycled and reloaded to a level of 10.5 g Ni/l.

EXAMPLE 2

A series of strip tests were carried out at various O/A ratios using an organic feed (40 volume % LIX-64N) containing 10.5 g Ni/l. The aqueous strip solution contained 150 g $NH_3$/l and 88 g $CO_2$/l. The strip tests were made at ambient temperature using a contact time of 6 minutes. The obtained strip equilibrium data are given in Table I below. The strip equilibrium diagram FIG. 1 suggest that stripping of Ni from 9.5 g/l to less than 3 g/l can be achieved in 3 stages, yielding a strip concentrate containing 20 g Ni/l.

TABLE I

| Strip Solution: | 150 g/l $NH_3$ (total), 88 g/l $CO_2$ 40 | | |
|---|---|---|---|
| Organic Feed: | v/v % LIX-64N containing 10/5 g/l Nickel | | |
| O/A Ratio | g/l Nickel | | % Stripped |
| | Organic | Aqueous | |
| 20 | 0.89 | 0.453 | 91.5 |
| 10 | 1.58 | 0.889 | 85.0 |
| 3 | 2.34 | 2.62 | 77.7 |
| 1 | 3.66 | 6.77 | 65.1 |
| 0.5 | 4.46 | 11.5 | 57.5 |
| 0.25 | 5.48 | 19.8 | 47.8 |
| 0.1 | 7.45 | 29.8 | 29.0 |

EXAMPLE 3

The system of FIG. 2 was run with four copper extraction stages, two nickel scrub stages, two ammonia scrub stages, two nickel extraction stages and three nickel strip stages. Copper strip and nickel strip were mixed and pumped into the extraction circuits at different flow rates. During running, copper and nickel samples were taken every hour [after running initially for 1½ hours to adjust levels and flow rates]. The flow rates were adjusted to:

Cu extraction-organic: 32 ml/min
Ni extraction-organic: 68 ml/min
leach solution: 68 ml/min
nickel scrub: 64 ml/min
nickel scrub recycle: 62 ml/min
$NH_3$ scrub: 8 ml/min
$NH_3$ scrub recycle: 60 ml/min
copper strip: 34 ml/min
copper strip recycle: 34 ml/min
nickel strip: 20.4 ml/min
nickel strip recycle: 12 ml/min The results of hourly sample analysis were as shown in Table I and S indicates the first stage of nickel strip and E indicates the last stage of copper extraction.

TABLE II

| Hour | Place | g/l Cu | g/l Ni |
|---|---|---|---|
| 1 | S | 0.0149 | 13.2 |
| 1 | E | 0.0469 | 6/18 |
| 2 | S | 0.0148 | 16.6 |
| 2 | E | 0.0429 | 6.41 |
| 3 | S | 0.0167 | 19.1 |
| 3 | E | 0.424 | 6.51 |
| 4 | S | 0.0185 | 18.8 |
| 4 | E | 0.0453 | 6.48 |
| 5 | S | 0.0195 | 18.6 |
| 5 | E | 0.0522 | 6.47 |
| 6 | S | 0.0217 | 18.6 |
| 6 | E | 0.0520 | 6.43 |
| 7 | S | 0.0222 | 18.2 |
| 7 | E | 0.0492 | 6.39 |
| 8 | S | 0.0230 | 18.15 |
| 8 | E | 0.0749 | 6.45 |

EXAMPLE 4

A continuous run repeat of Example 3, with three exceptions was made. The exceptions were: (1) a third nickel extraction stage was added; (2) a new leach solution containing 4.98 g Cu/l was used for the entire run; (3) a new copper strip solution was used containing 159 g/l free $H_2SO_4$ instead of 166 g/l $H_2SO_4$. Otherwise all conditions and flow rates were the same.

The entire circuit was operated for 1.2 hours in order to adjust levels and obtain steady state. At the end of this short run, a sample of the raffinate was taken to serve as the start of subsequent hourly analyses and was found to contain 0.0036 g/l of nickel.

During the run, hourly samples of raffinate, nickel strip concentrate, and copper barren leach solution were taken for immediate analysis of nickel and copper. Later, hourly samples of organic feed and copper strip concentrate were alos taken and the results are shown in Table III. Cells (each stage) of the nickel extraction and nickel strip apparatus were sampled at the end of the run [i.e. approximately hour 1] and the copper and nickel content of the organic and aqueous phases, together with cobalt and zinc data for the organic phase, are given in Table IV (in g/l).

TABLE III

| Hour | Stream | g/l Cu | g/l Ni | g/l Co | g/l Zn |
|---|---|---|---|---|---|
| 1 | Copper barren leach solution | 0.016 | 5.46 | | |
| 1 | Raffinate | | 0.005 | | |
| 1 | Nickel Strip concentrate | 0.024 | 13.8 | .011 | .040 |
| 2 | Copper barren leach solution | 0.016 | 6.00 | | |
| 2 | Raffinate | | 0.006 | | |
| 2 | Nickel strip concentrate | 0.019 | 16.9 | .013 | .033 |
| 3 | Copper barren leach solution | 0.019 | 5.96 | | |
| 3 | Raffinate | | 0.008 | | |
| 3 | Nickel strip concentrate | 0.026 | 16.2 | .013 | .022 |
| 4 | Copper barren leach solution | 0.019 | 6.00 | | |
| 4 | Raffinate | | 0.008 | | |
| 4 | Nickel strip concentrate | 0.026 | 17.5 | .013 | .023 |
| 5 | Copper barren leach solution | 0.016 | 5.95 | | |
| 5 | Raffinate | | 0.007 | | |
| 5 | Nickel strip concentrate | 0.026 | 17.8 | .014 | .023 |
| 6 | Copper barren leach solution | 0.019 | 6.00 | | |
| 6 | Raffinate | | 0.007 | | |
| 6 | Nickel strip concentrate | 0.023 | 17.5 | .014 | .027 |
| 7 | Copper barren leach solution | 0.023 | 6.12 | | |
| 7 | Raffinate | 0.001 | 0.008 | | |
| 7 | Nickel strip concentrate | 0.021 | 18.4 | .015 | .027 |
| 8 | Copper barren leach solution | 0.024 | 6.05 | | |
| 8 | Raffinate | 0.001 | 0.008 | | |
| 8 | Nickel strip concentrate | 0.021 | 18.8 | .016 | .026 |
| 9 | Copper barren leach solution | 0.024 | 6.01 | | |
| 9 | Raffinate | 0.001 | 0.008 | | |
| 9 | Nickel strip concentrate | 0.021 | 18.4 | .015 | .027 |

TABLE IV

| | Organic | | | | Aqueous | |
|---|---|---|---|---|---|---|
| | g/l Ni | g/l Cu | g/l Co | g/l Zn | g/l Ni | g/l Cu |
| 1st Ni Ext. Stage | 8.64 | 0.786 | 0.0074 | 0.0044 | 1.13 | 0.0005 |
| 2nd Ni Ext. Stage | 3.98 | 0.758 | | | 0.105 | 0.0006 |
| 3rd Ni Ext. Stage | 2.53 | 0.762 | | | 0.0085 | 0.0006 |
| 1st Ni Strip Stage | 6.26 | 0.782 | 0.0053 | 0.0022 | 18.49 | 0.0219 |
| 2nd Ni Strip Stage | 4.68 | 0.782 | | | 11.14 | 0.0298 |
| 3rd Ni Strip Stage | 3.29 | 0.776 | 0.0049 | 0.0018 | 4.85 | 0.0262 |

In applying the invention, the plotting of equilibrium diagrams, planning of numbers of extraction stages and equipment selection for particular ammoniacal leach solutions and desired throughputs will be in accordance with state of the art criteria set out for instance in "Liquid-Liquid Extraction" at vol. 8, pp. 719–761 of Kirk-Othmer, Encyclopedia of Chemical Technology (Wiley 1965, 2d Edition), and Perry's Chemical Engineers Handbook (McGraw Hill). The pressure reduction of carbonate slurry can be at 150°–200°C, 200–500 psig overpressure as described in the Kunda et al paper cited above.

It is evident that those skilled in the art, once given the benefit of the foregoing disclosure, may now make numerous other uses and modifications of, and departures from the specific embodiments described herein without departing from the inventive concepts. Consequently, the invention is to be construed as embracing each and every novel feature and novel combination of features present in, or possessed by, the apparatus and techniques herein disclosed and limited solely by the scope and spirit of the appended claims.

What is claimed is:

1. Nickel recovery process comprising
providing an aqueous feed phase comprising nickel metal values in ammoniacal solution and adjusting the ammonia concentration therein to 20–60 grams per liter,
contacting said feed with an immiscible organic chelating, ion exchange phase comprising a benzophenoxime to effect hydrogen ion-metal ion exchange between the two phases and loading the organic phase with nickel ion,
contacting said loaded organic phase with an ammonia containing aqueous stripping phase to effect stripping of nickel ions from said loaded organic phase into said aqueous stripping phase, and
recovering nickel values from said aqueous stripping phase, and wherein said benzophenoxime has the formula:

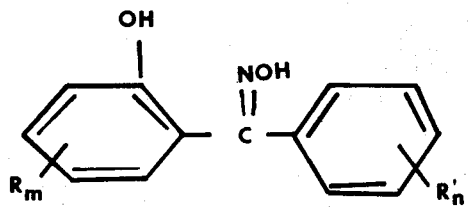

in which R and R' may be individually alike or different and are saturated aliphatic groups of 1–25 carbon atoms, ethylenically unsaturated aliphatic groups of 3–25 carbon atoms or —OR" where R" is a saturated or ethylenically unsaturated aliphatic group as defined, $m$ and $n$ are 0, 1, 2, 3 or 4 with the proviso that both are not 0 and the total number of carbon atoms in $R_m$ and $R'_n$ is from 3–25, and
said aqueous stripping solution has an ammonia concentration 80–200 grams per liter and said aqueous feed solution has a carbon dioxide content of 10–50 grams per liter and said aqueous strip solution has a carbon dioxide content of 50–100 grams per liter.

2. Nickel recovery process in accordance with claim 1 wherein
the organic comprises a mixture of
a. said benzophenoxime

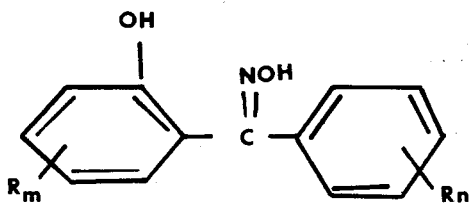

in which R and R' may be individually alike or different and are saturated aliphatic groups of 1–25 carbon atoms, ethylenically unsaturated aliphatic groups of 3–25 carbon atoms or —OR'' where R'' is a saturated or ethylenically unsaturated aliphatic group as defined, $m$ and $n$ are 0, 1, 2, 3 or 4 with the proviso that both are not 0 and the total number of carbon atoms in $R_m$ and $R'_n$ is from 3–25, and b. an α-hydroxy aliphatic oxime of the formula

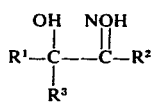

containing 14 to 40 carbon atoms total and where $R^1$ and $R^2$ contain 6 to 20 carbon atoms and are ethylenically unsaturated hydrocarbon or branched chain alkyl groups and $R^3$ is selected from the group consisting of hydrogen and ethylenically unsaturated hydrocarbon and branched chain alkyl groups of 6 to 20 carbon atoms, said benzophenoxime (a) and α-hydroxy aliphatic oxime (b) being further characterized as being essentially insoluble in water and having a solubility of at least about 2% by weight in an essentially water immiscible organic solvent and said α-hydroxy aliphatic oxime (b) being present in the proportion of 1–100% based on the weight of the benzophenoxime (a).

3. Nickel recovery process in accordance with claim 2 wherein the benzophenoxime comprises 2 hydroxy-4-nonyl-benzophenoxime.

4. Nickel recovery process in accordance with claim 3 wherein the oxime comprises 5, 8-diethyl-7-hydroxy-6-dodecanone oxime.

* * * * *

UNITED STATES PATENT AND TRADEMARK OFFICE
CERTIFICATE OF CORRECTION

PATENT NO. : 3,907,966
DATED : September 23, 1975
INVENTOR(S) : Roald R. Skarbo et al It is certified that error appears in the above-identified patent and that said Letters Patent are hereby corrected as shown below:

On the first page, in the block identified as "[75] Inventor" add --David L. Natwig, Brighton, Mass.--.

Signed and Sealed this twenty-seventh Day of January 1976

[SEAL]

Attest:

RUTH C. MASON
*Attesting Officer*

C. MARSHALL DANN
*Commissioner of Patents and Trademarks*